Patented Sept. 26, 1939

2,173,912

UNITED STATES PATENT OFFICE 2,173,912

BARIUM HYDROXIDE PRODUCTION

Albert Thomas Mertes, Newport, Del., assignor to E. I. du Pont de Nemours & Company, Wilmington, Del., a corporation of Delaware No Drawing. Application May 1, 1937,
Serial No. 140,173

12 Claims. (Cl. 23—186)

This invention relates to the production of barium compounds, and more particularly to the production of barium hydroxide in relatively pure physical condition.

More specifically the invention contemplates producing pure barium hydroxide by a reaction process which is of relatively short duration and capable of economical commercial exploitation.

The production of barium hydroxide through reaction of barium sulfide and zinc oxide according to the equation:

$$BaS + H_2O + ZnO \rightleftharpoons Ba(OH)_2 + ZnS$$

while generally known, has not proved suitable for commercial adaptation, due to the fact that under usual working conditions, the reaction is very slow, fails to go to completion, requires a prolonged time period (usually in excess of 8 hours) and is commercially impractical due to undue zinc losses which ensue as a result of incomplete reaction. Should the reaction conditions be so modified and regulated that a zinc-free barium hydroxide results, further prolongation of the reaction will be had and in the end the barium hydroxide yields will be so low that the process will be wholly unadaptable commercially. Again (even should one be successful in eliminating objectionable zinc loss or contamination, other impurities (such as alkali metal or ammonium salts) will persistently be present in the ultimate product. These difficulties will still exist to an undesirable extent even should an excess of zinc oxide be employed, since the precipitated product obtained will be so voluminous in character as to require repeated and difficult washings in order to purify the same, which of course reduces to an objectionable extent the ultimate yield of barium hydroxide recoverable. Should pigment grade zinc oxide be utilized in the reaction, the initial cost of this type of starting material will render the process uneconomical and therefore commercially prohibitive for barium hydroxide recovery alone.

I have found that these disadvantages in prior barium hydroxide production may be completely obviated and the invention accordingly provides an improved process wherein a substantially pure and high yield of barium hydroxide obtains. It is also among the objects of the invention to provide a process in which the reaction quickly goes to completion, and within a minimum period of time, sufficiently short in duration to completely adapt the same for commercial exploitation. Another object includes the provision of a process in which only a minimum amount of zinc is requisite for employment in the reaction and the provision of a process in which an equimolecular quantity of a low cost and relatively impure metallic oxide or hydroxide, particularly a non-reactive zinc oxide, such as treated ash or roasted ore, may be effectively employed. Other and further objects and advantages will be obvious from the ensuing description.

Accordingly, the invention broadly contemplates reacting at elevated temperatures a solution containing a relatively low and minimal concentration of barium sulfide with a metallic oxide or hydroxide, while maintaining the reactants under a substantially superatmospheric pressure.

In a more specific and preferred embodiment, the invention contemplates reacting equimolecular proportions of a solution of barium sulfide with zinc oxide or zinc hydroxide at an elevated temperature, while maintaining the reactants under a pressure substantially greater than atmospheric.

In order that the invention may be more clearly understood, the following illustrative example is given, which is not to be taken as in any wise in limitation of the invention:

Example

Into an autoclave equipped with a suitable agitating device were charged 194.3 parts by weight of BaS in form of a water solution measuring 20° Bé. at 176° F. (192.6 g. BaS/L) and the chemically equivalent weight of zinc oxide (92.5 parts by weight) in the form of a moist mass containing about 30% of water. This charge was equivalent in volume to about three-fourths the volume of the autoclave.

The autoclave was then closed, and heat was applied externally until the gauge showed a steam pressure of 50 pounds (about 298° F.). The reaction mass was maintained at this temperature during subjection to agitation and it was found that in less than one hour the reaction was complete, as evidenced by the absence of soluble sulphides and soluble zinc.

The reaction mass was then cooled and the contents of the autoclave filtered and washed with hot water. The clear filtrate consisted of substantially pure solution of 15.4% Ba(OH)$_2$, in which neither soluble sulphides nor soluble zinc was present. As a result of this operation, a 100% conversion of barium was obtained.

In an operation similar to the above, but employing atmospheric pressure, conversion of a 20° Bé. barium sulphide solution was incomplete even after ten hours of heat treatment at an elevated temperature, substantial quantities of unreacted barium sulphide being present at the conclusion of reaction. The barium hydroxide was relatively impure, containing soluble sulfides, the presence of which of course is objectionable in commercial barium hydroxide. Additionally, at the end of 10 hours barium conversion was incomplete.

While in the foregoing example I have illustrated my invention as adaptable in a batch operation wherein pressure is generated internally in the reaction vessel by virtue of steam generation, and maintained without heat loss due to boiling at atmospheric pressure, it is obvious that a continuous or semi-continuous process may be likewise employed. Similarly, any other well known and practical expedient for providing pressure within the reaction vessel may be employed, although I preferably cause the pressure to be induced by self-generation, i. e., through vapor generation from the reactants within the closed reaction vessel due to external heating.

Among the distinctive advantages which I find result by pressure employment in my invention is the decided decrease in the reaction time required, as well as affording a complete reaction with a minimum amount of zinc. While a steam pressure of 50 pounds gauge has been set forth in the foregoing example, this is merely preferred in the particular instance and such extent of pressure will be found desirable, particularly where a moderately reactive zinc oxide or lower concentration barium sulfide is utilized. Generally, any pressure as, for example, 5 pounds above atmospheric or higher, will be beneficial. Where, however, relatively low pressures, for instance, 5–10 pounds above atmospheric, are employed, a little longer time period for reaction will be required to effect desired completion. For most practical and commercial adaptations, it will be found that a relatively moderate pressure, approximating, for example, substantially 15 pounds above atmospheric, will prove satisfactory and sufficient for rapid and complete conversion. Again, it will also be found that the pressure used should depend upon and preferably be correlated with the temperature employed, as well as the strength of the reaction barium liquor. For example, if the barium liquor is relatively low in strength, say, 10° Bé., then a higher and preferably correlated pressure and temperature should be employed, whereby the reaction time will correspond favorably with an operation in which, say, a pressure of 15 pounds and higher strength barium liquor of, say, 20° Bé. are utilized.

In my preferred adaptations, however, I employ pressures ranging from substantially 15 to 100 pounds above atmospheric. Optimum, beneficial results are obtainable within this range— i. e., high yields of relatively pure barium hydroxide with a relatively quick reaction and complete conversion. The specified upper limit of 100 pounds is not critical, however, since obviously higher pressures, of the order of 250 pounds or higher, may be employed, depending upon the type of apparatus used in the reaction and the speed of conversion desired. As a matter of fact, in instances where a less reactive zinc oxide or roasted ore is employed, pressures as high as approximately 150 or 200 pounds may be required.

Although specific temperatures have been set forth hereinbefore, these are not to be considered critical, since temperatures employable in the invention are subject to variance over a relatively wide range. For instance, using a finely-divided fumed zinc oxide material and a pressure of 25 pounds gauge, a temperature of 130° C. will be found useful in obtaining complete and desired conversion with high yields of pure barium hydroxide. On the other hand, when zinc materials such as roasted ash are employed, due to the physical nature of the zinc oxide, the time required for conversion will be greatly increased. In such instances, and in order to obtain the complete and accelerated reaction desired, a temperature approximating substantially 160° C. with a pressure of substantially 75 pounds above atmospheric will prove advantageous. It will be seen, therefore, that a wide range of temperatures may be employed in the invention. Accordingly, I contemplate employing temperatures ranging from as low as 103° C. to as high as 200° C. or higher. As has been indicated hereinbefore, it will be found desirable to correlate the temperature employed with the pressure used, since as the temperature is lowered to the barium sulfide solution boiling point (at atmospheric pressure), the time of reaction required becomes necessarily increased. The effect which pressure-temperature bears to reaction time is aptly illustrated by the following table:

| Temperature, ° C. | Gauge | Conversion time |
| --- | --- | --- |
|  | Lbs. per sq. in. | Hours |
| 100 | 0 | 10½ |
| 110 | 6 | 6 |
| 120 | 14 | 1½ |
| 130 | 24½ | ½ |
| 160 | 75 | ¼ |

While a barium sulfide of 20° Bé. gravity has been exemplified as utilizable, it will be appreciated that solutions of lesser or greater concentration may likewise be employed. Obviously, the lower the specific gravity of the barium liquor, the longer will be the reaction time. Alternatively, should stronger solutions of barium liquor be employed, say, up to 45° Bé. or higher, the reaction time will be found progressively increased in rapidity as the concentration becomes greater. Accordingly, I contemplate employing in the invention barium sulfide liquors ranging from as low as 10° Bé. (100 g/l.) to as high as 45° Bé. at 80° C. (500 g/l.), or higher. For most commercial adaptations, however, I preferably employ a barium sulfide liquor of at least 15° Bé. and for optimum results preferably employ temperatures ranging from substantialy 120° C. to 150° C. and barium sulfide concentrations of from substantially 180 g/l. to 250 g/l.

While in the preferred adaptation of my invention, I employ the oxides or hydroxides of zinc, the oxides or hydroxides of metals other than zinc may be employed, if desired. In general, I have found that compounds of the heavy metals which form insoluble sulfides are particularly adaptable for use. These include any of the oxides or hydroxides of metals which have a specific gravity greater than 4, and which form insoluble sulfides. Accordingly, the term "heavy metal compounds", as used herein and in the appended claims, embraces the oxides and hydroxides of these metals. Specifically, this class includes, among others, the oxides or hydroxides of lead, tin, copper, iron, antimony, cadmium, nickel, manganese, cobalt, vanadium, etc., or mixtures thereof, as well as mixtures of the same with zinc oxide or hydroxide. While the invention contemplates the use of this class of compounds, I preferably employ the metallic oxides or hydroxides which are soluble in barium hydroxide solution, especially lead oxide or hydroxide.

While equimolecular quantities of zinc oxide are preferably employed in the invention, in some instances a slight excess of this oxide may be desirable. For example, when a by-product zinc oxide material containing a minor quantity of relatively large lumps is employed, the outer surface only of such lumps becomes exposed to the other reactants, unless the oxide is ground prior to using. Consequently, the lumps become coated with zinc sulfide and the reaction of the internally contained zinc oxide necessarily becomes retarded. This, of course, will cause an increase in the total time of reaction and in such instance it will be found preferable to employ a slight excess of the reagent in order to obviate this possibility. Any excess so employed in no wise influences the reaction, since such excess remains chemically unchanged during and at the end of the operation.

It will be obvious from the foregoing that my invention affords many desirable and advantageous features. For example, it affords a process in which an excess of soluble sulfide (barium) may be employed during the reaction and dispenses with the necessity of using an excess of zinc oxide throughout the reaction; it permits of the utilization of relatively low grade zinc oxides such as the precipitated or fumed by-product types which require too long a time for reaction and too poor zinc conversion for practical use in prior processes; and, in addition, affords the utilization of such types of low grade material even though impurities such as lead oxide or other metallic oxides be present. The presence of lead oxide will prove beneficial and advantageous, since to the extent present the amount of zinc required in the reaction may be correspondingly reduced, due to the fact that this impurity will enter into the reaction and correspondingly increase the yields of barium hydroxide ultimately obtainable.

Should it be desired to simultaneously produce barium hydroxide and a pigment grade zinc sulfide for use in lithopone production, this may be effectually had by initially employing in my invention relatively pure zinc oxide, such as the precipitated variety, for reaction with the barium sulfide. In such instances, it will be found unnecessary to employ fumed zinc oxide or one of relatively fine particle size. The zinc sulfide precipitate may be separated from the barium hydroxide by conventional settling or filtration. The barium hydroxide may then be transferred to storage, while the zinc sulfide precipitate may be subjected to washing with hot water to remove any barium hydroxide present. By repeated washing with water, a raw pigment with a high zinc sulfide content will be obtained. Usually, however, moderate washing of the zinc sulfide precipitated, followed by neutralization with sulfuric acid, will be sufficient to obtain a product ranging from about 58 to 64% zinc sulfide, usually in the range of 60-62%. Alternatively, the zinc sulfide after water washing may be reslurried in water and neutralized with an acid such as hydrochloric acid. Following this treatment, the zinc sulfide may be washed free of the resulting barium chloride, to be followed by any of the known methods of alkalinity and sulfide adjustment. The zinc sulfide recovered, either prior or subsequent to calcination, may be blended with extenders such as barium sulfate or calcium sulfate to form the desired lithopone. Such blending may be effected in the dry state or while the same is in a wet slurry.

I claim as my invention:

1. A process for producing relatively pure, zinc-free barium hydroxide comprising reacting a solution of barium sulfide with an equimolecular proportion of zinc oxide, while maintaining the reactants under a superatmospheric pressure ranging from about 5 to 250 pounds and above the atmospheric boiling point of said barium sulfide solution.

2. A process for producing relatively pure, zinc-free barium hydroxide comprising reacting a solution of barium sulfide with mixtures of zinc oxide and lead oxide, the amount of total oxides present being in substantially equimolecular proportion to the sulfide, while maintaining the reactants under a superatmospheric pressure ranging from about 5 to 250 pounds above the atmospheric boiling point of said barium sulfide solution.

3. A process for producing relatively pure, zinc-free barium hydroxide comprising reacting a solution containing a concentration of barium sulfide in excess of 100 g/l with zinc oxide in equimolecular proportion, while maintaining the reactants under a superatmospheric pressure ranging from substantially 5 to 250 pounds and a temperature above the atmospheric boiling point of said barium sulfide solution.

4. A process for producing zinc-free, pure barium hydroxide comprising reacting a solution of barium sulfide with zinc oxide in equimolecular proportions while maintaining the reactants under an elevated temperature ranging from 103° C. to 200° C. and at a pressure ranging from substantially 5 to 250 pounds above atmospheric.

5. A process for producing barium hydroxide comprising reacting a solution of barium sulfide with zinc hydroxide in substantially equimolecular proportions, while maintaining the reactants under an elevated temperature and at a pressure ranging from substantially 5 to 250 pounds above atmospheric.

6. A process for producing zinc-free, pure barium hydroxide comprising reacting a solution of barium sulfide with an equimolecular quantity of zinc oxide, while maintaining the reactants under an elevated temperature ranging from 103° C. to 200° C. and at a pressure ranging from about 15 to 100 pounds above atmospheric.

7. A process for producing barium hydroxide comprising reacting a solution of barium sulfide with an equimolecular quantity of zinc hydroxide while maintaining the reactants under an elevated temperature and at a pressure ranging from about 15 to 100 pounds above atmospheric.

8. A process for producing relatively pure barium hydroxide comprising reacting a barium sulfide solution ranging in concentration from 180–250 g/l. with an equimolecular quantity of zinc oxide, while maintaining the reactants under a superatmospheric pressure ranging from about 15 to 100 pounds and a temperature ranging from 120° C.–150° C.

9. A process for the simultaneous production of relatively pure, zinc-free barium hydroxide and pigment zinc sulfide comprising reacting a solution of barium sulfide with an equimolecular quantity of relatively pure zinc oxide, while maintaining the reactants under an elevated temperature ranging from 103° C. to 200° C. and at a pressure ranging from about 15 to 100 pounds in excess of atmospheric.

10. A process for the simultaneous production of relatively pure barium hydroxide and pigment zinc sulfide comprising reacting a solution of barium sulfide with an equimolecular quantity of relatively pure zinc hydroxide, while maintaining the reactants under an elevated temperature and at a pressure ranging from about 15 to 100 pounds in excess of atmospheric.

11. A process for producing zinc-free, relatively pure barium hydroxide comprising reacting a solution of barium sulfide with a substantially equimolecular proportion of a zinc compound from the group consisting of an oxide and hydroxide, while maintaining the reactants under an elevated temperature ranging from about 103° C. to about 200° C. and at a pressure ranging from about 5 to 250 pounds above atmospheric.

12. A process for producing zinc-free, relatively pure barium hydroxide comprising reacting a solution of barium sulfide with a substantially equimolecular proportion of a zinc compound from the group consisting of an oxide and hydroxide, while maintaining the reactants under an elevated temperature ranging from about 120 to about 150° C. and at a pressure ranging from about 15 to 100 pounds above atmospheric.

ALBERT THOMAS MERTES.